Patented Nov. 27, 1928.

1,693,417

UNITED STATES PATENT OFFICE.

JUSTIN F. WAIT, OF NEW YORK, N. Y.

FILTERING PROCESS.

No Drawing. Application filed December 21, 1922, Serial No. 608,346. Renewed May 18, 1928.

This invention relates to filtering processes and is a modification of or improvement on the process described in my pending application on filtering process and apparatus filed February 2, 1920, Serial Number 355,592, which resulted in Patent Number 1,512,321, the present application being at least in part a continuation of said application.

In said application, as originally presented, a disclosure was made of an optional process in which, in order to remove certain components of a filter cake, such as impregnated solvents, an atmosphere of vapor of water or of a liquid immiscible or partly miscible with said components, was applied to the filtering chamber, as by passing steam into the same, which by contact with the solvent or other material in the chamber will cause the specified material or solvent to be carried off for subsequent recovery of the matter volatilized. The subject of the present application involves this conception, together with certain ancillary steps, as will more fully appear hereinafter.

The process may be carried out in a rotary pressure filter of the type disclosed in said application, or in any other suitable mechanism of the type generally known as pressure filters, the steam in the present instance being introduced into the chamber containing the filtering drum or other membrane thru an inlet pipe and exhausted therefrom thru another pipe, and then if desired returned to the drum after separation and compression for repeated use. As will be understood, the precipitate is collected in the form of a cake on the surface of the drum or membrane, from which it is scraped after washing or other treatment.

Accordingly I have found that increased filtration efficiency may be obtained by imposing an atmosphere of steam at superatmospheric pressure on materials being filtered by a continuous filter. The effect of the higher steam pressure is to increase rate of filtration by applying additional pressure and decreasing the viscosity of the liquid, hence increasing the filtration rate by increasing its temperature.

A second effect of higher steam pressure is to decrease the amount of original or mother liquor contained in the filter cake. This is caused by the higher pressure in displacing most of the liquor and its ability to thoroly wash the cake and sweep it free from entrained mother liquor, the increased solubility of entrained parts in the hot vapors of hot liquors, especially when unsaturated or wet steam is used, facilitating this with products which are soluble or have appreciable vapor pressure. In the latter case by increased temperature and the use of steam the steam picks up appreciable quantities of the volatile product and removes it from the cake.

In the special case of liquors containing products volatile with steam exceptional results have been obtained. It has been found possible to practically free the cake from the volatile component.

Where superheated steam is used the cake is delivered almost free from water thus frequently making further drying of the cake unnecessary. With volatile components the superheat causes a greater quantity of that volatile part to be removed per pound of steam and also increased capacity by further decreasing viscosity.

Mutual solubility of many products is increased by temperature rise. Typical examples of this are phenol-water and aniline-water mixtures. With each of these the mutual solubitity of each becomes infinite at temperatures easily reached by steam pressures, therefore steam used for filtering these and other like products is especially valuable and it is possible to completely replace the organic body, in the case cited, by means of steam.

The steam passing thru the cake and filtering medium may be separated mechanically from the filtrate liquors and later condensed or used as ordinary steam for heating purposes. It may also be compressed and reused for filtering purposes. Concentration of the volatile component of this steam may be accomplished by passing it thru a fractionating column. In cases where make up water is added at another part of the process this steam is condensed thus insuring complete recovery of the volatile components.

During filtration with steam the cake may be washed with any desired liquid as benzol, naphtha, alcohol and other products which will dissolve or wash material from the filter cake. The wash liquid may then be separated from the cake by the steam and where desired may be recovered.

This may be exemplified by the filtration of a mixture of xylidine, water and iron oxide obtained from the reduction of nitroxyol by means of iron and dilute acid. The oxide is separated in a continuous pressure filter containing an atmosphere of steam.

As the layer of oxide is formed and carried above the liquid level to free it from loose liquid, a wash of naphtha is applied by means of sprays. The naphtha replaces most of the xylidine contained in the oxide, and in turn is eventually removed by means of steam passing thru the layers of filter cake.

In this way the xylidine is removed or "washed" from the filter cake by means of a less viscous and more easily removed liquid, which is quite completely removed by means of steam. This thus affords a means for removing the valuable xylidine from the filter cake, and at the same time recovering the naphtha used for the removal. In this case the oxide residue also has considerable value, and, as is desired, it is obtained in quite a pure form.

It is sometimes desirable to first filter the xylidine-oxide mixture, and to take the filter cake so produced, and mix it with naphtha or other organic liquid, and to subsequently filter the mixture. Likewise, the original reduction mass may be mixed with naphtha or other organic substance before filtration.

It may readily be seen, therefore, that a variety of procedures may be chosen from, depending upon the economic conditions surrounding the process, and the results to be obtained. In some cases the filter cake will be recovered, and in other cases the entire operation involving the same principles may be carried out merely for the purpose of drying the filter cake, the same operating principles being used for various purposes.

To avoid contamination of the products filtered with ordinary lubrication oil, I have found it desirable to lubricate the bearings of the filter by feeding under pressure either a product volatile with steam to insure its being sufficiently carried away by the steam or use of liquor identical or similar to that filtered. For example in filtering a cake containing nitrobenzol, nitrobenzol is fed thru the lubricating system, such quantities as are used being satisfactory for lubricating and being fully recoverable and therefore costing nothing. Water cooling of bearings is unnecessary when this product is fairly viscous, of high boiling point and can be pumped into the gearings in appreciable quantities. Unless this is the case, water cooled bearings and stuffing boxes are quite essential when using steam. In special cases I have found water fed under pressure to be an excellent lubricant and cooling agent combined.

For thoro washing it is sometimes desirable to use wet steam or even spray water into the steam to condition it. Water spray may be used in the filter chamber to facilitate washing of the cake. Liquids other than water may also be used.

Very efficient washing and drying of a cake may be obtained by using air supersaturated and mixed with water. For accomplishing this steam and air may be mixed as the atmosphere over the cake and effecting filtration. These vapors or parts thereof when exhausted from the chamber may be compressed and recirculated thru the filter cake. In doing this material freed from the cake may be separated from the vapors on passing from the filter.

The substitution of steam for air normally used effects high economy because by direct use of a gaseous fluid from a prime generator—such as a steam boiler—the losses due to compression of a second fluid—air—are eliminated. This becomes prominent in large scale operation.

The same principles as are embodied in the foregoing permit of the use of vapors of any other liquids such as benzol which may be used to free filter cake from a liquid such as water or from a solid or other liquid soluble in it as a liquid or as a vapor. As an example of this an organic cake but slightly soluble in benzol and containing water may be completely dried by passing benzol vapor thru the cake, collecting the discharged vapors, separating it from the water and returning it under pressure to the high pressure side of the filter. In carrying this out the vapors may all be condensed and a continuous separator used to separate the water from the benzol. The benzol will be run to a boiler and be vaporized under pressure for reuse. The small amount of product dissolved in the benzol may be separated therefrom by precipitation due to concentration in the boiler.

An example of the above described modification of this invention is the removal of alcohol and water contained in diphenylguadine in a mixture in which it may be obtained during its manufacture. The alcohol may be filtered from the solid diphenylguadine by filtration which in some cases may be followed by water wash, altho the water wash is not always necessary, especially if the mixture filtered contains dilute alcohol, and not concentrated.

After production of the filter cake containing water, the product may be dried by passing benzol vapors thru the filter cake. If a super-saturated vapor or a wash of liquid benzol is used, the subsequent drying operation may be facilitated. In any event, the passage of the benzol thru the filter cake removes the water contained therein. The vapors and liquids passing thru the filter cake during the "drying" stage may be recovered as by condensation which method yields a high recovery of the valuable benzol, such recovery being carried out as suggested above.

It will readily be seen that this method embodies the same principle as the example previously given wherein xylidine was separated from iron-oxide, the main difference being that in the case now under consideration, the solid matter was originally "wetted" by means of an alcohol-water mixture, and subsequently removed by inorganic method, whereas in the case of the iron-oxide mixture, the solid was first wetted by means of an organic oil, and subsequently dried by means of water vapor or steam.

Other liquids could also be used to remove water or other products from a filter cake. Such operation combines filtration and drying steps with great saving in operating costs and equipment required. Products easily decomposed when exposed to air in a moist condition may be filtered and dried in one step and turned out in the dry and stable form. In such cases an inert gas may be mixed with the vapors of the liquid and to effect economy compression thereof may be used for recirculation or reuse thereof.

I claim:

1. A method of filtering and also separating an organic component from an inorganic body in the filter cake, consisting in subjecting material in the filter to pressure of vapors of a volatile substance in which the organic component is soluble and removing the organic component by passing said vapors through the filter cake and subsequently recovering the materials passing through the cake.

2. A process for removing water from a filter cake including passing the vapors of an organic compound capable of vaporizing the water thru the same while distributed over a filter bed pervious to the vapors, and recovering the organic compound vaporized.

3. A filtering method consisting of subjecting the material in the filter to the pressure of superheated vapors of a volatile substance in which material retained by the filter cake is soluble, and removing the material retained by the cake after filtering, by passing said superheated vapors through the filter cake and subsequently recovering the materials passing through the cake.

4. The method of drying products wetted with water in a filter consisting of passing benzene vapors thru the same while distributed on a bed pervious to the vapors and subsequently recovering the benzene.

5. In pressure filtering the method of drying a filter cake embodying using in the filter a mixture of fine particles of an organic liquid in a gas inert with respect to the component parts of the cake.

6. In pressure filtering the method of drying and washing the filter cake embodying using in the filter a gas, inert with respect to component parts of the cake, in mixture with vapors of a wash liquid.

In testimony whereof, I affix my signature.

JUSTIN F. WAIT.